US007415101B2

(12) United States Patent
Bushey et al.

(10) Patent No.: US 7,415,101 B2
(45) Date of Patent: Aug. 19, 2008

(54) SYSTEM, METHOD AND SOFTWARE FOR A SPEECH-ENABLED CALL ROUTING APPLICATION USING AN ACTION-OBJECT MATRIX

(75) Inventors: Robert R. Bushey, Cedar Park, TX (US); John M. Martin, Austin, TX (US); Benjamin A. Knott, Round Rock, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 728 days.

(21) Appl. No.: 10/736,296

(22) Filed: Dec. 15, 2003

(65) Prior Publication Data

US 2005/0132262 A1 Jun. 16, 2005

(51) Int. Cl.
*H04M 1/64* (2006.01)
*G06F 17/27* (2006.01)

(52) U.S. Cl. .................. 379/88.04; 379/88.01; 704/9

(58) Field of Classification Search .............. 379/88.01, 379/88.02, 88.03, 88.04
See application file for complete search history.

(56) References Cited

U.S. PATENT DOCUMENTS

| | | | | |
|---|---|---|---|---|
| 5,027,384 | A | 6/1991 | Morganstein | 379/67 |
| 5,675,707 | A | 10/1997 | Gorin et al. | 395/2.66 |
| 5,796,394 | A | 8/1998 | Wicks et al. | 345/329 |
| 5,850,433 | A | 12/1998 | Rondeau | 379/201 |
| 6,081,774 | A | 6/2000 | de Hita et al. | 704/9 |
| 6,091,805 | A | 7/2000 | Watson | 379/93.17 |
| 6,094,635 | A | 7/2000 | Scholz et al. | 704/270 |
| 6,154,527 | A | 11/2000 | Porter et al. | 379/88.18 |
| 6,167,370 | A | 12/2000 | Tsourlkov et al. | 704/9 |
| 6,269,153 | B1 * | 7/2001 | Carpenter et al. | 379/88.02 |
| 6,314,402 | B1 | 11/2001 | Monaco et al. | 704/275 |
| 6,327,566 | B1 | 12/2001 | Vanbuskirk et al. | 704/257 |
| 6,411,686 | B1 | 6/2002 | Porter et al. | 379/88.18 |
| 6,539,078 | B1 | 3/2003 | Hunt et al. | 379/88.04 |
| 6,560,329 | B1 | 5/2003 | Draginich et al. | 379/265.02 |
| 6,742,021 | B1 * | 5/2004 | Halverson et al. | 709/218 |
| 6,856,957 | B1 * | 2/2005 | Dumoulin | 704/257 |
| 6,895,083 | B1 * | 5/2005 | Bers et al. | 379/88.01 |
| 2001/0014852 | A1 | 8/2001 | Tsourlkov et al. | 704/9 |
| 2001/0039490 | A1 | 11/2001 | Verbitsky et al. | 704/9 |

(Continued)

OTHER PUBLICATIONS

International Search Report and Written Opinion; PCT/US05/29545; pp. 7, mailing date Feb. 8, 2006.

*Primary Examiner*—David R. Hudspeth
*Assistant Examiner*—Samuel G Neway
(74) *Attorney, Agent, or Firm*—Jackson Walker L.L.P.

(57) ABSTRACT

A system, method and software for facilitating a speech-enabled call routing application using an action-object matrix is disclosed. In operation, a natural language user utterance may be evaluated to identify an action and object available in an action-object matrix indicating transactions or operations available to a user. Depending upon the contents of the natural language user utterance, additional prompts and/or a disambiguation dialogue may be effected to elicit an available action-object combination selection from the user. Following identification of an action-object combination from the natural language user utterance, the action-object matrix may cooperate with a look-up table to identify an appropriate use routing destination. Following identification of an appropriate routing destination, the user connection may be routed to a service agent or module configured to facilitate the user selected transaction as indicated by the action-object combination.

11 Claims, 5 Drawing Sheets

U.S. PATENT DOCUMENTS

| | | |
|---|---|---|
| 2001/0049688 A1 | 12/2001 | Fratkina et al. .......... 707/104.1 |
| 2002/0007267 A1 | 1/2002 | Batchilo et al. ................ 704/9 |
| 2002/0010574 A1 | 1/2002 | Tsourikov et al. ............. 704/9 |
| 2002/0022955 A1 | 2/2002 | Troyanova et al. ............. 704/9 |
| 2002/0087328 A1 | 7/2002 | Denenberg et al. .......... 704/275 |
| 2002/0087497 A1 | 7/2002 | Trolanova et al. ............. 706/45 |
| 2002/0091530 A1 | 7/2002 | Pattaja ....................... 704/275 |
| 2002/0184002 A1 | 12/2002 | Galli ............................. 704/7 |
| 2002/0193994 A1 | 12/2002 | Kibre et al. .................. 704/260 |
| 2003/0026409 A1 | 2/2003 | Bushey et al. .......... 379/211.02 |
| 2003/0043975 A1 | 3/2003 | Arunachalam ........... 379/88.16 |
| 2003/0061039 A1 | 3/2003 | Levin ........................ 704/246 |
| 2003/0143981 A1 | 7/2003 | Kortum et al. .............. 455/414 |
| 2003/0212558 A1 | 11/2003 | Matula ....................... 704/260 |
| 2004/0032941 A1 | 2/2004 | Graham et al. .............. 379/219 |

* cited by examiner

FIG. 6

| OBJECTS | ACQUIRE | CANCEL | CHANGE | INQUIRE | INFORM | HOW TO USE | SCHEDULE | FIX REPAIR | WHERE | RECONNECT | MOVE | PAY |
|---|---|---|---|---|---|---|---|---|---|---|---|---|
| OPTIONAL SERVICES: CALLNOTES CALLFORWARDING CALLERID PACKAGES DSL LONGDISTANCE ETC. | • 214 | • | • | • | | • 212 | | • | | | | |
| BASIC SERVICE | • | | • | • | | • | | • | | | | |
| CPE | • | • | | • | | • | | • | | | | |
| ACCOUNT | | • | • | • | | | | | | | | |
| BILL | | • | • 206 | • | • | | | • | • 208 | | | • |
| ACQUISITION | | • | • | • | • | | • | | | | | |
| CANCELATION | | • | • | • | • | | • | | | | | |
| FIX-REPAIR | | • | • | • | • | | • | | | | | |
| MOVE | | • | • | • | • | • | • | | | | | |
| PAYMENT | | | | • | | | | | • | • 210 | | |
| OTHER PROVIDERS | | | | • | | | | | | | | |
| COUPONS SPECIALS | | | | • | | | | | | | | |
| NAME/ NUMBER | | | | • | | | | | | | | |
| STORE LOCATIONS | | | | | | | | | | | | |

200 — ACTIONS 202 — OBJECTS 204

SYSTEM, METHOD AND SOFTWARE FOR A SPEECH-ENABLED CALL ROUTING APPLICATION USING AN ACTION-OBJECT MATRIX

TECHNICAL FIELD OF THE INVENTION

The present invention relates generally to speech recognition and, more particularly, to speech recognition enabled automatic call routing service systems.

BACKGROUND OF THE INVENTION

Developments in speech recognition technologies support more natural language interaction between services systems and customers than that previously supported. One of the most promising applications of these new technologies is Automatic Call Routing (ACR). The goal of an ACR application is to determine why a customer is calling the service center and to route the customer to the most appropriate agent for servicing a customer request. Speech recognition technology generally allows an ACR application to recognize natural language statements so the application does not have to rely on a menu system. This allows the customer to state the purpose of their call "in their own words".

In order for an ACR application to properly route calls, the ACR must generally interpret the intent of the customer, identify the type or category of customer call, and then identify the correct routing destination for the call type. Identification of all the possible call types is a time intensive and extensive phase of the service center development process, because the call types are not usually not known prior to ACR development.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 6 is a diagram illustrating one embodiment of an action-object matrix incorporating teachings of the present invention.

DETAILED DESCRIPTION OF THE INVENTION

Preferred embodiments and their advantages are best understood by reference to FIGS. 1 through 6, wherein like numbers are used to indicate like and corresponding parts.

Figure 1:
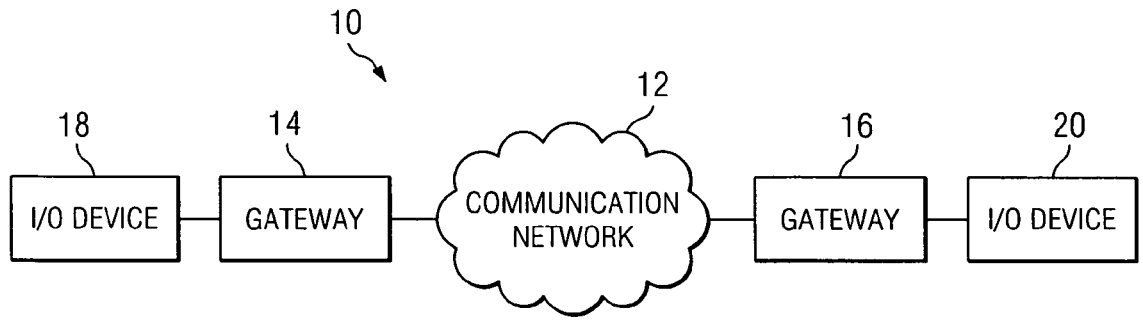
FIG. 1 is a schematic diagram depicting one embodiment of a telecommunications system incorporating teachings of the present invention.

Referring first to FIG. 1, a schematic diagram of an exemplary embodiment of a telecommunications system, indicated generally at 10 is shown. Telecommunication system 10 may include communication network 12 in communication with one or more gateway devices 14 and 16. Input/output (I/O) devices 18 and 20 are each preferably in communication with respective gateway devices 14 and 16. Accordingly, I/O devices 18 and 20 may be in selective communication with each other via gateway devices 14 and 16, and communication network 12.

In one embodiment, communication network 12 may be a public switched telephone network (PSTN). In alternate embodiments, communication network 12 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks.

Gateways 14 and 16 preferably provide I/O devices 18 and 20 with an entrance to communication network 12 and may include software and hardware components to manage traffic entering and exiting communication network 12 and conversion between the communication protocols used by I/O devices 18 and 20 and communication network 12. In some embodiments, gateways 14 and 16 may function as a proxy server and a firewall server for I/O devices 18 and 20. In some embodiments, gateways 14 and 16 may be associated with a router (not expressly shown), operable to direct a given packet of data that arrives at gateway 14 or 16, and a switch (not expressly shown), operable to provide a communication path in and out of gateway 14 or 16.

In the present embodiment, I/O devices 18 and 20 may include a variety of forms of equipment connected to communication network 12 and accessible to a user. I/O devices 18 and 20 may be telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. I/O devices 18 and 20 may be equipped for connectivity to communication network 12 via a PSTN, DSLs, a cable network, a wireless network, or any other appropriate communications channel.

Figure 2:
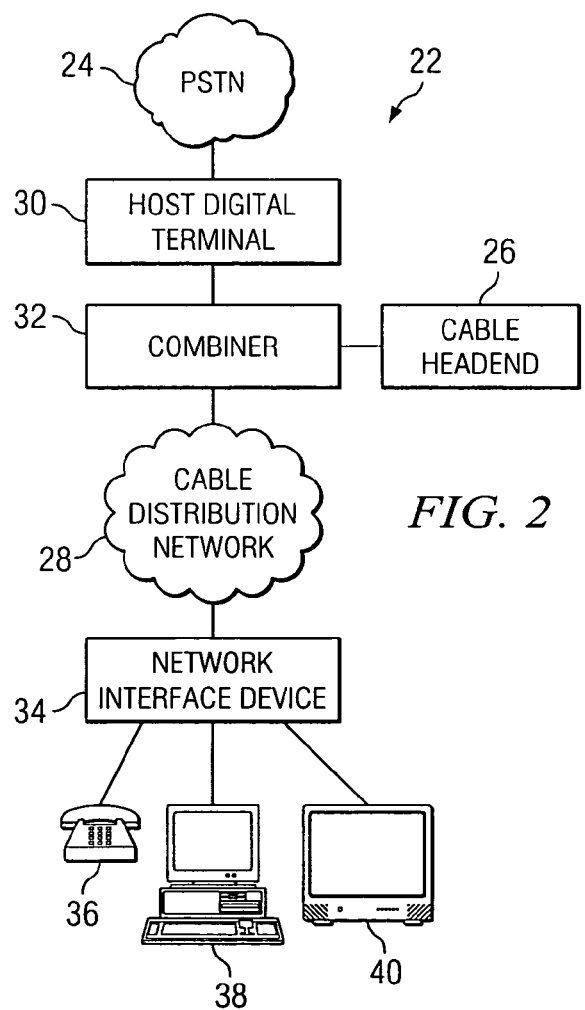
FIG. 2 is a schematic diagram depicting an alternate embodiment of a telecommunications system incorporating teachings of the present invention.

Referring now to FIG. 2, a block diagram of an exemplary embodiment of a telecommunication system 22 is shown. In the exemplary embodiment shown, system 22 preferably includes a PSTN 24 and cable head-end 26 in communication with cable distribution network 28. PSTN 24 may be in operable communication with host digital terminal (HDT) 30 and function to convert signals received from PSTN 24 for transmission over cable networks. Host digital terminal 30 and cable head-end 26 may be in communication with combiner 32. Combiner 32 may communicate data received from cable head-end 26 and/or PSTN 24 to cable distribution network 28. Cable distribution network 28 may further communicate data to network interface device 34 to a user via telephone 36, computer 38, television 40 or any other suitable I/O device. Cable head-end 26 may provide cable television programming and cable modem communications. Cable head-end 26 typically includes a cable modem termination system (not expressly shown) for sending and receiving digital cable modem signals.

Figure 3:
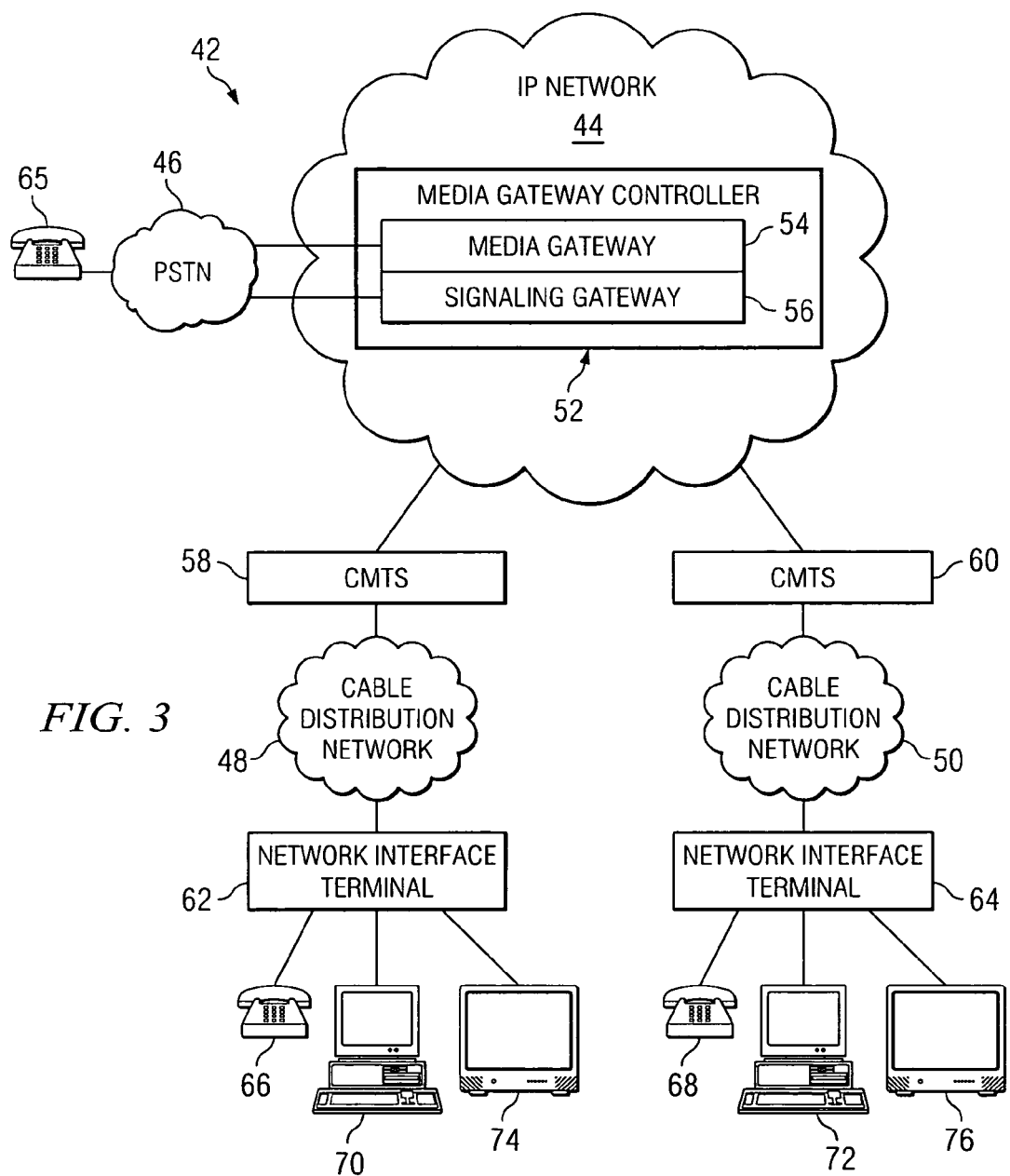
FIG. 3 is a schematic diagram depicting a further embodiment of a telecommunications system incorporating teachings of the present invention.

Referring next to FIG. 3, a block diagram of an exemplary embodiment of a telecommunication system 42 is shown.

This exemplary embodiment generally includes interconnected IP network 44, PSTN 46, and cable distribution networks 48 and 50. IP network 44 may include media gateway controller 52, media gateway 54, and signaling gateway 56. Media gateway 54 and signaling gateway 56 may be in operative communication with PSTN 46 and facilitate communication of information therebetween. IP network 44 may further communicate with cable distribution networks 48 and 50 via cable modem termination systems (CMTS) 58 and 60, respectively. CMTS 58 and 60 may convert IP packets received from IP Network 44 for transmission on cable distribution networks 48 and 50 and convert signals received from cable distribution networks 48 and 50 into IP Packets for transmission to IP Network 44. Cable distribution networks 48 and 50 may communicate information with users via network interface terminals 62 and 64. Network interface terminals 62 and 64 may provide data services to users through I/O devices such as, telephones 66 and 68, computers 70 and 72, and televisions 74 and 76. One or more data services may also be provided to a user through PSTN 46 and one or more I/O devices such as telephone 65.

Telecommunication system 42 of FIG. 3 preferably allows transmission of services to be delivered to users where such services include, without limitation, voice over Internet protocol ("VoIP"), video over Internet, video-on-demand over broadband connections, and the ability to view television and film images as well as broadcasts. In addition, one of ordinary skill will appreciate that other embodiments can be deployed with many variations in the number and type of I/O devices, communication networks, the communication protocols, system topologies, and myriad other details without departing from the spirit and scope of the present invention.

Figure 4:
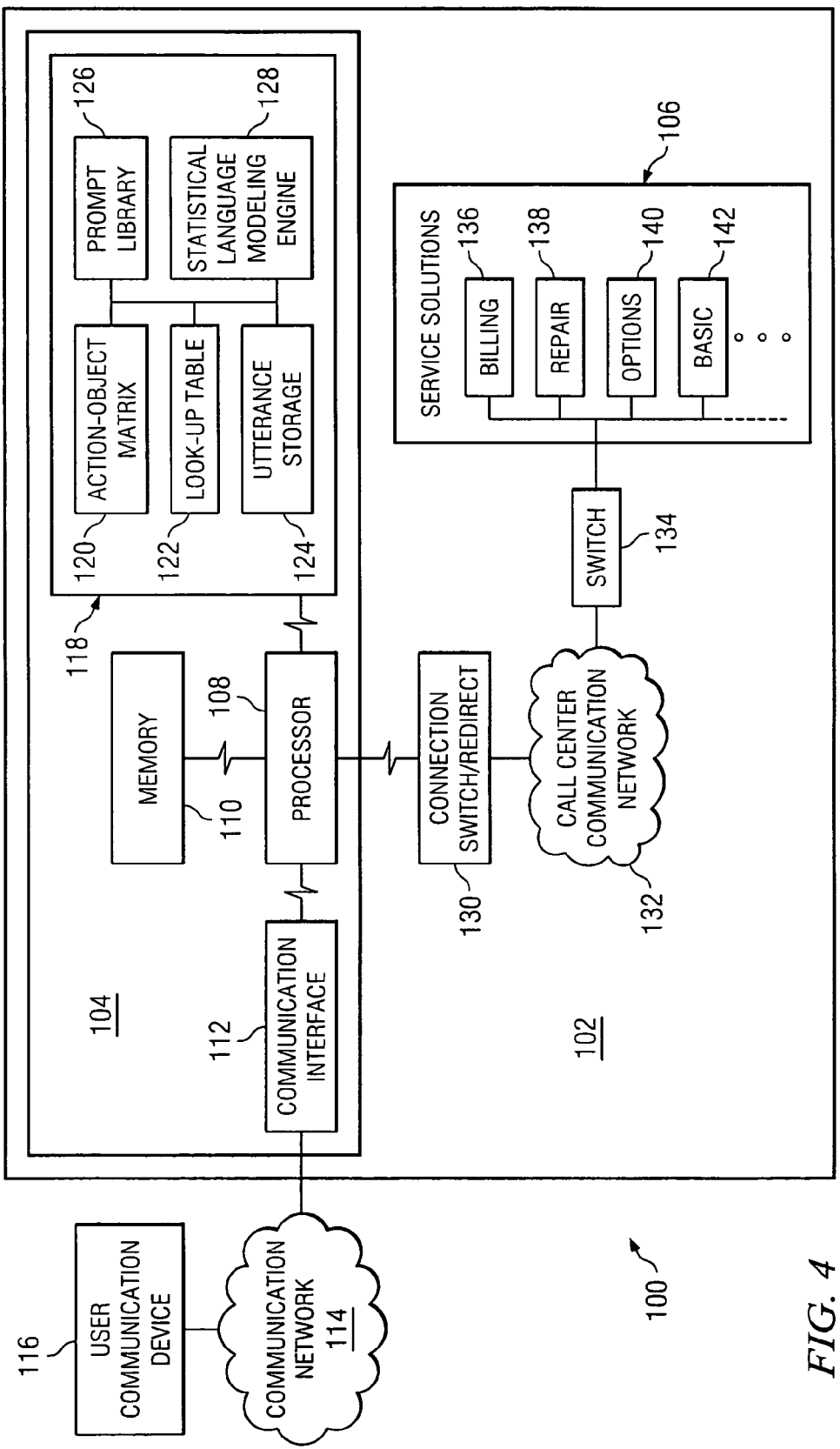
FIG. 4 is a block diagram depicting an exemplary embodiment of a service center system incorporating teachings of the present invention.

Referring now to FIG. 4, a block diagram illustrating one embodiment of a service center incorporating teachings of the present invention is shown. While reference herein is made primarily to a customer service call center, alternate implementations of teachings of the present invention may be employed without departing from the spirit and scope thereof.

Illustrated generally at 100 is one embodiment of a system operable to permit a user to perform one or more transactions via a plurality of service agents available from a service center. As illustrated in FIG. 4, system 100 preferably includes service center 102. Service center 102 may include one or more computing apparatuses 104 operably coupled to one or more transaction processing service solutions 106.

Preferably included in communication apparatus 104, is processor 108. Operably coupled to processor 108 of computing apparatus 104 is memory 110. Computing apparatus 104 preferably employs processor 108 and memory 110 to execute and store, respectively, one or more instructions of a program of instructions.

Also included in computing apparatus 104, as illustrated in FIG. 4, is communication interface 112. Communication interface 112 is preferably operable to couple computing apparatus 104 and/or service center 102 to an external communication network 114. According to teachings of the present disclosure, communication network 114 may be implemented as a PSTN, a cable telephony network, an IP telephony network, a wireless network, a hybrid cable/PSTN network, a hybrid IP/PSTN network, a hybrid wireless/PSTN network, or any other suitable communication network or combination of communication networks.

Communication interface 112 preferably cooperates with communication network 114 and user communication device 116 to permit a user to perform one or more transactions via service center 102. As described above, user communication device 116 may be a wireless or wireline telephone, dial-up modem, cable modem, DSL modem, or any other appropriate type or combination of communication equipment available to a user.

In operation, service center 102 preferably permits a user to, in their natural language, request processing or performance of one or more transactions available from transaction processing service solutions 106. To enable such processing, computing apparatus 104 may include or have access to one or more storage devices 118 including one or more programs of instructions substantially operable to interpret the intent of a user, identify a solution sought by the user and route the user to an appropriate service solution agent.

To aid in the interpretation, identification and routing operations of service center 102, storage 118 preferably includes action-object matrix 120, look-up table 122, utterance storage 124, prompt library 126, as well as one or more speech recognition capabilities, such as statistical language modeling engine 128. Additional detail regarding the operation and cooperation of the various components, preferably included in storage 118, will be discussed in greater detail below.

In one embodiment of the present invention, computing apparatus 104 is preferably communicatively coupled to one or more connection switches or redirect devices 130. Connection switch or redirect device 130 preferably enables computing apparatus 104, upon determining an appropriate destination for the processing of a user selected transaction, to route the user via communication network 132 and, optionally, one or more switches 134, to an appropriate agent or module of transaction processing service solution 106.

Transaction processing service solution 106 preferably includes a plurality of agents of modules operable to perform one or more operations in association with the processing of a user selected transaction. For example, transaction processing service solution 106 may include one or more agents or modules operable to perform billing service solutions 136i repair service solutions 138, option service solution 140, basic service solutions 142, as well as other service solutions. In addition, the agents or modules implemented in or in association with transaction processing service solutions 106 may include, but are not limited to, automated or self-service data processing apparatuses, live technician support (human support), as well as combinations thereof.

Figure 5:
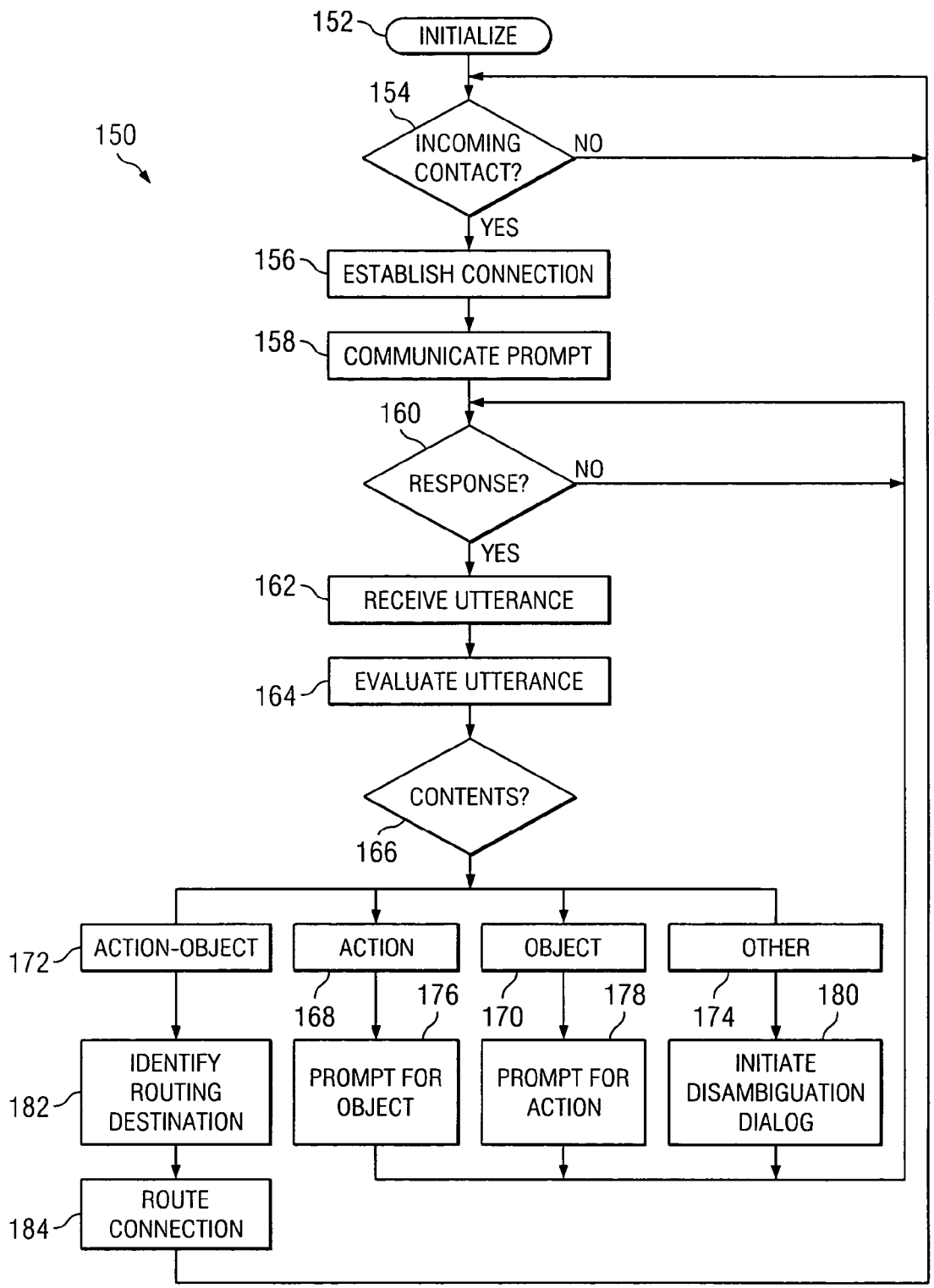
FIG. 5 is a flow diagram depicting one embodiment of an action-object based speech recognition enabled automatic call routing method incorporating teachings of the present invention.

Referring now to FIG. 5, one embodiment of a method for a speech-enabled call routing call application using an action-object matrix is shown according to teachings of the present invention. As mentioned above, method 150 of FIG. 5 may be implemented in one or more computing apparatuses 104 of one or more service centers, such as a telecommunications call service center. Upon initialization at 152, method 150 preferably proceeds to 154. At 154, method 150 preferably provides for and awaits an incoming contact from a user. In one embodiment, method 150 at 154 may await user contact via user communication device 116 across communication network 114 with communication interface 112 of computing apparatus 104. Myriad embodiments of user contact with a service or call center are contemplated within the spirit and scope of the teachings of the present disclosure.

Upon detection of an incoming contact at 154, method 150 preferably proceeds to 156 where a communication connection with the incoming contact is preferably established. As suggested above, establishing a communication connection with an incoming contact at 156 may include, but is not limited to, receiving a user phone call via a PSTN or a wireless network, as well as numerous other communication connection implementations.

Once a communication connection has been established at 156, method 150 preferably proceeds to 158. At 158, one or more prompts may be communicated to the user. In one aspect, the communication of one or more prompts at 158 is aimed at eliciting from the user via the communication connection a request for the processing of one or more desired transactions or operations. For example, computing apparatus at 158 may access prompt library 126 of storage 118 to generate a user transaction selection prompt such as, "Thank you for calling our service center. Please tell me how we may help you today." Alternate embodiments of generating one or more prompts configured to elicit user selection of a desired transaction are contemplated within the spirit and scope of teachings of the present invention.

At 160 of method 150, user response to the communicated prompt at 158 is preferably awaited. Upon detection of a user response at 160, method 150 preferably proceeds to 162 where a natural language utterance of the user in response to the prompt communicated at 158 is preferably received. Receipt of a natural language utterance from a user at 162 may include storage of the user's natural language utterance in utterance storage 124 of computing apparatus storage 118. Permanent or temporary storage of a natural language user utterance, such as in utterance storage 124, may enable or simplify the performance of speech recognition analysis thereon.

Following receipt of a natural language user utterance at 162, method 150 preferably proceeds to 164. At 164, the user's natural language utterance is preferably evaluated in pursuit of interpreting or identifying the intent of the user and the operation or processing requested. In one embodiment of the present invention, evaluation of a natural language user utterance at 164 may include the use of one or more speech recognition technologies, such as that available from statistical language modeling engine 128 of computing apparatus 104. By evaluating the natural language user utterance at 164 using speech recognition technology, such as statistical language modeling engine 128, recognition of a natural language transaction selection may be achieved. As suggested above, statistical language modeling engine 128 may cooperate with utterance storage 124 in its performance of natural language user utterance evaluation at 164.

According to teachings of the present invention, statistical language modeling engine 128 preferably evaluates the natural language user utterance received at 162 in cooperation with action-object matrix 120. In the evaluation of a natural language user utterance at 164, the speech recognition technology preferably employed by computing apparatus 104 seeks to identify an action, an object or an action-object combination from the natural language user utterance. The provision of action-object matrix 120 simplifies and reduces the development costs of automated call routing applications. By creating a finite number of transaction options via action-object matrix 120, proper routing of a user to a service agent or module 136, 138, 140 or 142, may be accomplished with great efficiency, i.e., substantially eliminating user routing errors and, therefore, user re-routing.

As at least a portion of the natural language user utterance evaluation performed at 164 includes seeking whether the natural language user utterance includes an action, object or action-object combination, method 150, at 166, preferably determines whether a natural language user utterance includes either an "action" 168, an "object" 170, an "action-object" combination 172 or other information 174.

If at 166 it is determined that the natural language user utterance contains only an action 168, method 150 preferably proceeds to 176 where one or more additional prompts may be communicated to the user. The prompts are preferably directed to eliciting an object selection in a subsequent natural language user utterance. For example, referring to the action-object matrix depicted in FIG. 6, it may have been determined from the natural language user utterance that the user desires to inquire as to certain aspects available from service center 102. Having identified that the user wishes to make an "inquiry", computing apparatus 104 may cooperate with prompt library 126 and action-object matrix 120 to prompt the user for selection of an "object" associated with the "inquire" action. As illustrated in FIG. 6, examples of objects associated with the "inquire" action include, but are not limited to, in one embodiment, optional services, basic service, billing, cancellation, repair, payment, specials as well as name and number.

Similarly, if at 166 it is determined that the natural language user utterance contains only an "object" 170, method 150 preferably proceeds to 178 where one or more prompts for a natural language utterance from the user preferably containing an "action" selection may be generated. Referring again to the action-object matrix generally depicted in FIG. 6, if it is determined from the natural language user utterance that the user desires transaction processing in association with a service bill, computing apparatus 104 may cooperate with action-object matrix 120 and prompt library 126 to generate one or more prompts directed to eliciting user selection, in their own words, of an "action" associated with the bill "object". As shown in FIG. 6, examples of actions associated with the bill object may include, but are not limited to, in one embodiment, inquiry, information, fixing or repairing and paying.

It should be understood that the action-object matrix depicted generally in FIG. 6 is included primarily for purposes of illustration. As such, alternate embodiments of an action-object matrix such as the action-object matrix depicted in FIG. 6 may be implemented without departing from the spirit and scope of teachings of the present invention.

If at 166 evaluation of the natural language user utterance leads to identification of neither an "action" 168, "object" 170 nor an "action-object" combination 172, method 150 preferably proceeds to 180 where a disambiguation dialogue may be initiated and performed. In one example, it may be determined at 166 that the contents of the natural language user utterance contains more than one action available in an associated action-object matrix, more than one "object" available in an associated action-object matrix, no indication of an "action" nor an "object", as well as other information failing to indicate user selection of a desired transaction. In such an event, method 150 preferably provides for additional dialogue to be performed with the user in an effort to elicit an "action-object" combination from the user. Following prompting for an "object" at 176, for an "action" at 178 or initiation and performance of disambiguation dialogue at 180, method 150 preferably returns to 160 where a response may be awaited as described above. Method 150 then preferably proceeds through the operations at 162, 164 and 166, in one embodiment, until an action-object combination 172 has been elicited from the user in a natural language utterance.

Following identification from the user's natural language utterance of an action-object combination 172, method 150 preferably proceeds to 182. At 182, computing apparatus 104 preferably cooperates with action-object matrix 120 and look-up table 122 to identify a preferred or proper routing destination for processing of the user's selected transaction. As suggested above, the routing destinations identified at 182 may include routing destinations associated with the agents or modules available in transaction processing service solutions 106. Agents or modules 136, 138, 140 and 142 may include automated transaction processing available via computing apparatus 104 or a similar device, live support, combinations thereof, as well as other transaction processing options.

Following identification of a preferred or proper routing destination at 182, method 150 preferably proceeds to 184. At 184, the user connection is preferably routed to the appropriate, proper or preferred routing destination indicated in look-up table 122. Following the routing of the user connection at 184, method 150 preferably returns to 154 where the next user connection may be awaited.

Referring again to FIG. 6, an action-object matrix incorporating teachings of the present invention is shown. As shown in FIG. 6, action-object matrix 200 preferably includes a plurality of columns or rows, depending on implementation, of actions 202. Action-object matrix 200 preferably also includes a plurality of rows or columns, again depending upon implementation, of objects 204. The intersection of an action row or column with an object column or row, respectively, generally defines a transaction or task available from service center 102 via, for example, one or more service modules or agents 136, 138, 140 and 142.

In accordance with teachings of the present invention, service center 102, method 150 and action-object matrix 200 preferably cooperate to interpret user intent, identify a desired transaction and the correct routing destination from natural language user utterances. For example, using actions 202 and objects 204 of action-object matrix 200, in conjunction with method 150, a natural language user utterance such as, "How much do I owe on my bill?" may be evaluated to contain the action-object combination inquire/bill 206. In a further example, the natural language user utterance, "I have a problem with a charge on my bill" may produce the action-object combination fix-repair/bill 208. In still another example, the natural language user utterance, "Where can I go to pay my phone bill?" may be evaluated to include the action-object combination of where/payment 210. In yet another example, the natural language user utterance, "How do I set up Call Forwarding?" may be evaluated to include the action-object combination how-to-use/option services 212. In yet another example, the natural language user utterance, "I'd like to get Call Notes." may be evaluated to include the action-object combination acquire/optional services 214.

As mentioned above, action-object matrix 200, such as may be stored in action-object matrix storage 120, preferably cooperates with a look-up table to identify the routing destination associated with an identified action-object combination. For example, upon identifying action-object combination inquire/bill 206 from a natural language user utterance, computing apparatus 104 may utilize action-object matrix storage 120 and look-up table 122 to determine that the appropriate routing destination for inquire/bill action-object combination 206 is bill agent or module 136 of transaction processing service solution 106. In another example, upon identifying action-object combination fix-repair/bill from a natural language user utterance, computing apparatus 104 cooperating with action-object matrix storage 120 and look-up table 122 may determine that an appropriate routing destination for the user connection includes repair, agent or module 138 of transaction processing service solutions 106. Additional implementations of associating a look-up table with an action-object matrix may be utilized without departing from the spirit and scope of teachings of the present invention.

Although the disclosed embodiments have been described in detail, it should be understood that various changes, substitutions and alterations can be made to the embodiments without departing from their spirit and scope.

What is claimed is:

1. A method for identifying a routing destination in a service center, comprising:
   prompting a user to convey a request;
   receiving a natural language utterance from the user;
   comparing the natural language utterance to an action-object matrix;
   identifying a routing destination based upon results of the natural language utterance to action-object matrix comparison;
   routing the user to the routing destination; and
   performing an action selected from the group consisting of:
   a first action comprising:
      querying the action-object matrix to identify related objects if only an action and not an object is included in the natural language utterance; and
      prompting the user for selection of a related object; and
   a second action comprising:
      querying the action-object matrix to identify related actions if an object and not an action is included in the natural language utterance; and
      prompting the user for selection of a related action.

2. The method of claim 1, further comprising initiating a disambiguation dialog with the user where an action-object combination cannot be found in the action-object matrix.

3. The method of claim 1, further comprising identifying at least one of an action, an object and an action-object combination using a statistical language modeling speech recognition utility.

4. A system for routing a service center user based on a natural language request, comprising:
   at least one processor;
   memory operably associated with the at least one processor; and
   a program of instructions storable in the memory and executable by the processor, the program of instructions operable to identify a task to be performed from a natural language user request and a task matrix, to direct the user to a service center agent for performance of the task, and to identify an action-object combination from the natural language user request; and locate a service agent to perform the task based on the identified action-object combination and the task matrix;
   wherein the task matrix includes a plurality of available service center actions each cross-referenced with one or more objects creating action-object combinations and where the action-object combinations define tasks available from a service center agent.

5. The system of claim 4, further comprising the service center agent operable to provide automated user assistance in performance of the task.

6. The system of claim 4, further comprising the service center agent operable to provide technician assisted performance of the task.

7. The system of claim 4, further comprising the program of instructions operable to reference a look-up table containing service center agent routing destinations in response to a match between an action and an object in the natural language utterance and an action-object combination in the action-object matrix.

8. The system of claim 4, further comprising the program of instructions operable to identify at least one of an action or an object in the natural language utterance to identify the task to be performed.

9. The system of claim 4, further comprising the program of instructions operable to prompt the user for at least one additional natural language user request in response to identifying an action and no object in the natural language user utterance.

10. The system of claim 4, further comprising the program of instructions operable to prompt the user for at least one additional natural language user request in response to identifying an object and no action in the natural language user utterance.

11. The system of claim 4, further comprising the program of instructions operable to prompt the user for confirmation of the identified task requested.

* * * * *

UNITED STATES PATENT AND TRADEMARK OFFICE
CERTIFICATE OF CORRECTION

PATENT NO. : 7,415,101 B2  Page 1 of 1
APPLICATION NO. : 10/736296
DATED : August 19, 2008
INVENTOR(S) : Robert R. Bushey, John M. Martin and Benjamin A. Knott It is certified that error appears in the above-identified patent and that said Letters Patent is hereby corrected as shown below:

On Page 2 of the Title Page, in the second column, 4th item:

(56) References Cited

U.S. PATENT DOCUMENTS

2003/~~0043975~~ 0043976 A1  3/2003   Arunachalam.................379/88.16

Signed and Sealed this

Seventh Day of October, 2008

JON W. DUDAS
*Director of the United States Patent and Trademark Office*